United States Patent Office 2,855,787
Patented Oct. 14, 1958

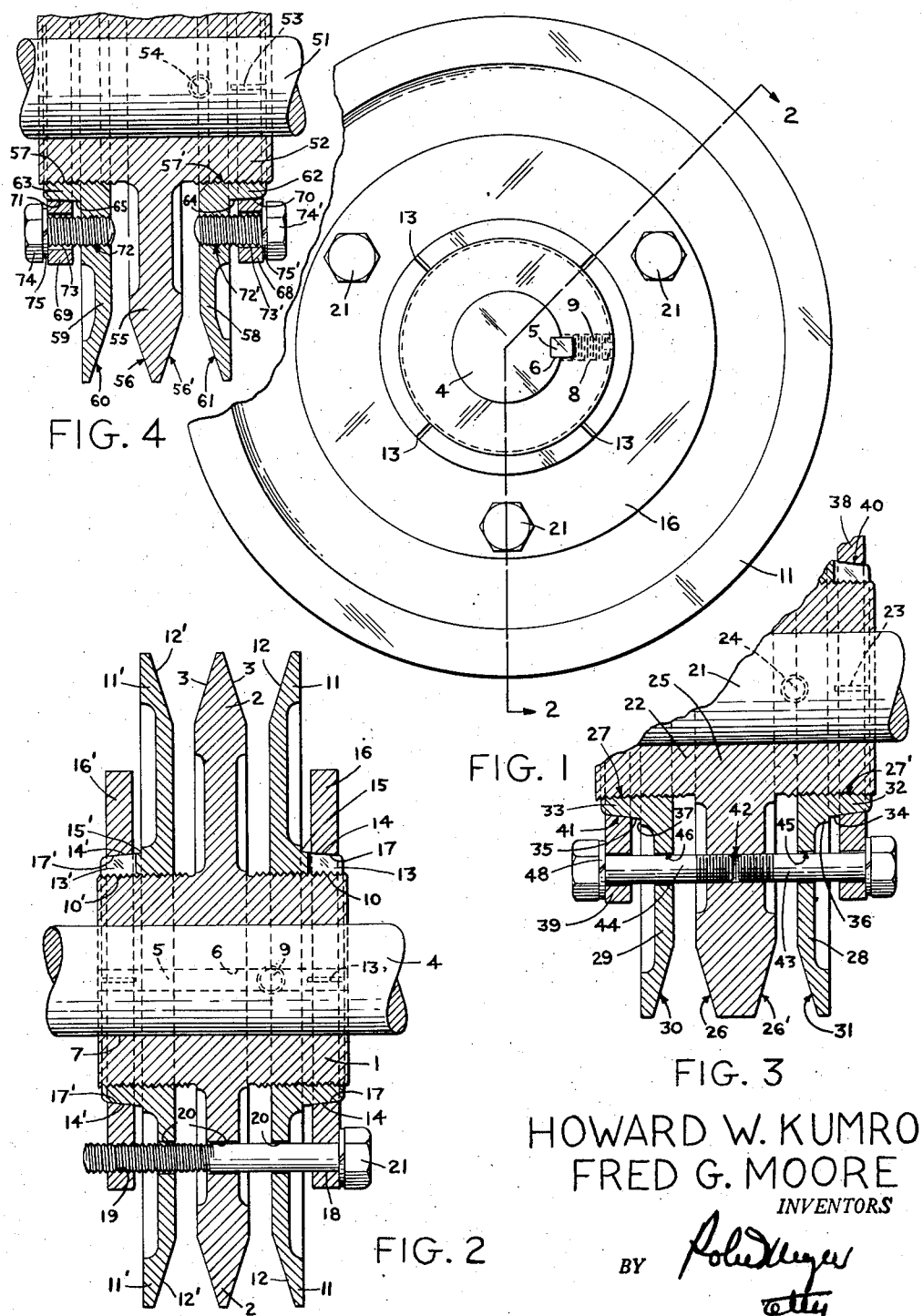

2,855,787

ADJUSTABLE PITCH SHEAVE

Howard W. Kumro and Fred G. Moore, Oil City, Pa., assignors to Worthington Corporation, Harrison, N. J., a corporation of Delaware Application May 3, 1954, Serial No. 427,024

3 Claims. (Cl. 74—230.17)

This invention relates to power transmitting sheaves and more particularly to an adjustable pitch sheave for adaptation on various industrial or commercial power equipment.

On the market today there are many types of variable pitch sheaves using either the split bushing or telescopic sleeve method. The drawback of those types of design is in the cumbersome locking device which limits the number of adjustable sheaves that may be adjustably held to the device.

Accordingly, it is one of the objects of this invention to provide a locking device simple in design, few in the number of parts used and unrestrictive as to the number of sheave elements that may be secured to the device.

This invention further provides that the integrally formed cylindrical hub may be of any desired width to provide separate and distinct transmitting sheave areas as the need may arise.

It is the further object of this invention to provide overall simplicity in design, compactness of parts, easy accessibility to all parts and easy adaptability to rotary members.

With these and other objects in view, as may appear from the accompanying specification, the invention consists of various features of construction and combination of parts which will be described in connection with the accompanying drawings, showing an adjustable pitch sheave of a preferred form embodying the invention, and the features forming the invention will be specifically pointed out in the claims.

In the drawings:

Figure 1 is a side view of a variable pitch sheave.

Figure 2 is a vertical section through the variable pitch sheave along line 2—2 of Figure 1.

Figure 3 is a vertical section through a modified form of the variable pitch sheave.

Figure 4 is a vertical section through another modified form of the variable pitch sheave.

Referring more particularly to the drawing, Figure 2 shows a hub 1 with a stationary or inner sheave element 2 formed integrally with said hub and having peripherally tapered faces 3 forming engaging surfaces for power belts.

The hub is fixedly held to a rotary shaft 4 by a key member 5 which is inserted in the slot 6 that is longitudinally cut in the rotary shaft and the bore 7 of said hub 1. A screw threaded hole 8 transverses said hub to the key slot 6 and has a set screw 9 therein which fixedly holds said key from axial movement along said slot 6.

The outer periphery of said hub 1 is screw threaded 10 and 10' on both sides of the stationary sheave element to receive outer or adjustable sheave elements 11 and 11' thereon which are movable axially towards or away from said stationary sheave element. The adjustable sheave elements 11 and 11' are tapered about their peripheral faces as at 12 and 12' to cooperate with the tapered surfaces 3 of said stationary sheave element to form engaging grooves for power transmitting belts. Incorporated as part of said adjustable sheave elements are split hubs 13 and 13' extending outwardly away from the inner sheave element and longitudinally along the thread means 10 and 10' of said hub 1. The outer circumferences of said split hubs are tapered 14 and 14' the slope rising inwardly towards the center of said adjustable sheave elements 11 and 11' terminating in abutment shoulders at 15 and 15' as shown in Figure 2. These tapered circumferences form part of a locking device hereinafter described.

Locking discs 16 and 16' having internally tapered circumference 17 and 17' cooperate with the outer tapered circumferences 14 and 14' of said adjustable sheave elements 11 and 11'. The locking discs are positioned on the outer periphery of said split hubs 13 and 13' achieving a snug fit with said split hubs when said locking discs are drawn inwardly toward the inner sheave element 2 for securely locking said adjustable sheaves in adjusted position. This is accomplished by spaced holes 18 and spaced threaded holes 19, depending on the way the system is locked in adjusted position, drilled through said locking washers axially parallel to and equidistant from said rotary shaft. In conjunction with the holes 18 and 19 of said locking discs, adjustable sheave elements 11 and 11' and stationary sheave element 2 have space-locking bolt receiving holes 20 drilled in longitudinal alignment with the aforementioned holes 18 and 19 enabling locking bolts 21 to be inserted therethrough for locking said adjustable sheave elements in adjusted position.

In operation the adjustable sheave elements 11 and 11' are arranged as shown in Figure 2 forming belt-engaging means between the tapered surfaces 3, 12 and 12' of the stationary sheave element and the adjustable sheave elements. The adjustable sheave elements 11 and 11' are movable axially toward or away from said fixed sheave element depending on the pitch diameter that is required for the specific power unit to be used.

Locking the device is accomplished initially by placing the locking discs 16 and 16' circumferentially around the tapered outer peripheries 14 and 14' of said split hubs 13 and 13' so that the inner circumferential tapers 17 and 17' of said locking discs are aligned properly with the aforementioned tapers. A snug fit is afforded when this initial step is properly carried out. Locking bolts 21 are then inserted through the holes drilled in the adjustable sheave elements 11 and 11', the inner sheave element 2 and the locking disc 16. In an adjusted position the head portion of said locking bolts 21 firmly rest on the outer portion of said locking disc 16 while at the other end the threaded portions of said locking bolt 21 are reecived into threaded bores 19 of the locking disc 16'. Tightening said locking bolts 21 with said locking discs in adjusted position applies a clamping action to the split hubs 13 and 13' on the threaded means 10 and 10' of hub 1 due to the circumferential force fitting action between the tapered surfaces of said locking discs 16 and 16' and said split hubs 13 and 13'.

Rotation of the adjustable sheave elements is prevented by the integrally formed inner sheave element 2 which has said locking bolts traversing it, thus restraining said locking bolts from moving in a circular orbit.

In the modified form of the invention shown in Figure 3 of the drawings, the construction allows for the addition of either or both of the movable sheave elements, and independent locking means is provided for each of the movable elements to allow for this change in operation.

Thus Figure 3 shows a rotatable shaft 21 having a hub 22 fixedly mounted thereon as by a key 23 and a set screw 24. The hub 22 has a stationary or inner sheave element 25 formed integrally therewith. Adjacent the outer peripheral portion of the stationary element 25 on either side thereof, tapered faces as at 26 and 26' will be formed for engaging a power belt as hereinafter described.

The outer periphery of the hub 22 is threaded on either side of the inner sheave element 25 as at 27 and 27' to receive for adjustment towards and away from said inner sheave element 25, the outer or adjustable sheave elements 28 and 29.

The adjustable sheave elements 28 and 29 also have tapered faces 30 and 31 adjacent the periphery thereof to cooperate with the tapered faces 26 and 26' respectively of the inner or stationary sheave element 25 whereby an engaging groove will be formed therebetween for power transmitting belts.

The adjustable sheave elements 28 and 29 are each provided with split hubs 32 and 33 extending outwardly and away from said inner sheave elements parallel to and in operational position in engagement with the threaded portions 27 and 27'. The outer circumferences of the split hubs 32 and 33 are tapered as at 34 and 35, the slope as in the preferred form rising in the direction of the inner sheave element 25 and terminating at the abutment shoulders 36 and 37, as is clearly shown in Figure 3.

These tapered circumferences, similarly, as in the form above described provide means for forming a locking device and thus annular locking discs 38 and 39 having internally tapered circumferences as at 40 and 41 are mounted on and cooperate with the tapered faces 34 and 35 respectively of the split hubs 32 and 33 on the adjustable sheave elements 28 and 29.

To lock the discs and hence the adjustable sheaves in position, circumferentially spaced threaded bores 42 are provided in the inner sheave element 25 parallel to the rotary shaft 21, which bores 42 receive locking bolts 43 and 44 extending through bores 45 and 46 circumferentially disposed on the respective locking discs 38 and 39 and adapted to be aligned with the bores 42 by mere manual rotation during assembly. Locking washers 47 and 48 are similarly provided to hold the locking bolts 43 and 44 respectively in their locked position.

In operation the hub element 22 is first locked to the rotary shaft 21 and then the adjustable sheave elements are adjusted inwardly or outwardly to produce the desired width between the faces 30 and 26 and the faces 31 and 26' for a power transmitting belt.

The locking discs 38 and 39 are then placed or moved on to the tapered faces 40 and 41 with the bores 45 and 46 in alignment with the threaded bores 42. The bolts 43 and 44 with their locking washers 47 and 48 may then be threaded into position and by moving the bolts inwardly the locking discs 38 and 39 will be brought into snug engagement with the tapered faces 40 and 41 of the split hub and locked the same to the hub, similar to the manner above described for the form of the invention shown in Figure 2.

When it is desired to change the width of the tapered faces of the inner and outer sheave elements the bolts 43 and 44 are backed off or moved outwardly to release the locking disc and the adjustable sheave elements 28 and 29 may then be adjusted to a new position and locked once again as above described.

It is clear from the above description, that if only one adjustable sheave element is desired that the respective adjustable sheaves may be independently utilized by reason of the separate locking means above described.

In the modified form of the invention shown in Figure 4 of the drawings, the construction not only allows for the addition of either or both of the movable sheave elements, and independent locking means for each of the movable elements but provides in addition a construction which allows for the situation where a heavy belt may be used which extends below the inner periphery of the engaging faces of the pulley.

Thus, Figure 4 shows a rotatable shaft 51 having a hub 52 fixedly mounted thereon as by a key 53 and a set screw 54. The hub 52 has a stationary or inner sheave element 55 formed integrally therewith. Adjacent the outer peripheral portion of the stationary element 55 on either side thereof, are tapered faces as at 56 and 56' which are formed for engaging a power belt as hereinafter described.

As in the form of the invention shown in Figures 2 and 3 the hub 52 will be threaded on either side of the inner sheave element 55 as at 57 and 57' to receive for adjustment towards and away from said inner sheave element 55, the outer or adjustable sheave elements 58 and 59.

The adjustable sheave elements 58 and 59 will also have tapered faces 60 and 61 adjacent the periphery thereof to cooperate with the tapered faces 56 and 56' respectively of the inner or stationary sheave element 55 whereby an engaging groove will be formed therebetween for receiving the power transmitting belts (not shown).

The adjustable sheave elements 58 and 59 are each provided with split hubs 62 and 63 extending outwardly and away from said inner sheave elements parallel to the threaded portions 27 and 27'. In operational position, the split hub portions will be in threaded engagement with the threaded portions 27 and 27'. The outer circumferences of the split hubs 62 and 63 as in the preferred form of the invention are tapered as at 64 and 65, the slope thereof rising in the direction of the inner sheave element 55, all of which is clearly shown in Figure 4 of the drawings.

These tapered circumferences as in the above described forms of the invention provide means for forming a locking device and thus annular locking discs 68 and 69 having internally tapered circumferences as at 70 and 71 are mounted on and cooperate with the tapered faces 64 and 65 respectively of the split hubs 32 and 33 on the adjustable sheave elements 58 and 59.

The adjustable sheave elements 58 and 59 are locked in position by tightening the discs 68 and 69 so that the tapered faces 70 and 71 thereof and the tapered faces 64 and 65 of the split hub 62 and 63 are in tight engagement with each other. This is accomplished through circumferentially spaced threaded bores 72 and 72' on the respective adjustable sheave elements 58 and 59 disposed parallel to the rotary shaft 51. Similarly, the locking discs 68 and 69 are also provided with circumferentially disposed bores 73 and 73', which bores are identically spaced so that they can be aligned to the bores 72 and 72' by manual rotation. When in alignment, threaded bolts 74 and 74' having locking washers 75 and 75' may be extended through the bores 73 and 73' respectively for engagement with the aligned bores 72 and 72'. By threading the bolt members 74 and 74' into and out of the threaded bores 72 and 72' respectively, the adjustable sheave elements 58 and 59 can be locked at any of their respective adjusted positions.

In operation, the hub element 52 is first locked to the rotary shaft 51 and then the adjustable sheave elements, either one or both are adjusted inwardly or outwardly to produce the desired width between the faces 60 and 56 or 61 and 56' for a power transmitting belt (not shown).

The locking discs 68 and 69 are then placed or moved onto the tapered faces 64 and 65 so that the bores 73 and 73' are in alignment with the bores 72 and 72'. The bolts 74 and 74' may now be threaded into position with their locking washers as is shown in Figure 4 of the drawings. By threading the bolts 74 and 74' inwardly the locking discs 68 and 69 respectively will be brought in to stud engagement with the tapered faces 64 and 65 of the split hubs 62 and 63 and hence will lock the same to the hub, similar to the manner above described for the form of the invention shown in Figure 2.

When it is desired to change the width of the tapered faces of the inner and outer sheave elements, the bolts 74 and 74' may be backed off or moved outwardly to release the locking discs and the adjustable sheave elements 58 and 59 adjusted to their new position and locked once again as above described.

By the use of the individual locking means for each of the adjustable sheaves, as is shown in Figure 4 of the drawings, the necessity for aligning with the fixed inner sheave element is eliminated and hence the space between the sheaves, i. e., the respective inner and outer elements, is free to receive a wide belt therebetween.

It will be understood that the invention is not limited to the specific construction or arrangement of parts shown, but that they may be widely modified within the invention defined by the claims.

What is claimed is:

1. A variable pitch sheave comprising a hub, a stationary or inner sheave element integral with said hub, threaded means on the outer periphery of said hub and disposed on each side of said inner sheave element, adjustable sheave elements threaded upon said hub for adjustment toward and away from said inner sheave element, said adjustable sheave elements and said inner sheave element having peripherally tapered outer surfaces forming V-belt engaging surfaces therebetween, said adjustable sheave elements having split hubs extending longitudinally along said threaded means outwardly from said inner sheave element, said split hubs tapered on their outer periphery to receive coacting spaced locking discs having internally tapered inner circumferences for engagement with the tapered circumferences of said split hubs, circumferentially spaced and axially aligned bores on said adjustable sheaves, said inner sheave, and said locking discs, the bores on one of said locking discs being threaded, and a plurality of threaded bolts to extend through said bores for engagement with said threaded bores of the one locking disc, whereby tightening of said bolts locks said adjustable sheaves in adjusted position.

2. A variable pitch sheave comprising a hub, a stationary or inner sheave element integral with said hub, threaded means on the outer periphery of said hub and disposed on each side of said inner sheave element, adjustable sheave elements threaded upon said hub for adjustment toward and away from said inner sheave element, said adjustable sheave elements and said inner sheave element having peripherally tapered outer surfaces forming V-belt engaging surfaces therebetween, said adjsutable sheave elements having split hubs extending longitudinally along said threaded means outwardly from said inner sheave element, said split hubs tapered on their outer periphery to receive coacting spaced locking discs having internally tapered inner circumferences for engagement with the tapered circumferences of said split hubs, circumferentially spaced and axially aligned bores on said adjustable sheaves, said inner sheave, and said locking discs, the bores on said inner sheave element being threaded, and a plurality of threaded bolts to extend through the bores of said locking discs and adjustable sheave elements for engagement with an end of each of said threaded bores of the inner sheave element, whereby tightening of said bolts locks said adjustable sheaves in adjusted position.

3. A variable pitch sheave comprising a hub, a stationary or inner sheave element integral with said hub, threaded means on the outer periphery of said hub and disposed on each side of said inner sheave element, adjustable sheave elements threaded upon said hub for adjustment toward and away from said inner sheave element, said adjustable sheave elements and said inner sheave element having peripherally tapered outer surfaces forming V-belt engaging surfaces therebetween, said adjustable sheave elements having split hubs extending longitudinally along said threaded means outwardly from said inner sheave element, said split hubs tapered on their outer periphery to receive coacting spaced locking discs having internally tapered inner circumferences for engagement with the tapered circumferences of said split hubs, circumferentially spaced threaded bores on said adjustable sheaves, and circumferentially spaced bores on said locking discs adapted to be aligned with said threaded bores, and a plurality of threaded bolts to extend through the bores of each locking disc for engagement with said threaded bores of the adjustable sheave nearest the said locking disc, whereby tightening of said bolts locks said adjustable sheaves in adjusted position.

References Cited in the file of this patent

UNITED STATES PATENTS

| Re. 4,288 | Buckman | Mar. 7, 1871 |
| 364,537 | Miller | June 7, 1887 |
| 1,353,382 | Crissinger | Sept. 21, 1920 |
| 1,758,182 | Strong | May 13, 1930 |
| 2,001,675 | Eisgruber | May 14, 1935 |
| 2,524,027 | Blackmarr | Oct. 3, 1950 |
| 2,633,031 | Browning | Mar. 31, 1953 |

FOREIGN PATENTS

| 622,461 | Great Britain | May 3, 1949 |
| 646,869 | Great Britain | Nov. 29, 1950 |
| 809,870 | Germany | Aug. 2, 1951 |